US008555356B2

(12) United States Patent
Flynn et al.

(10) Patent No.: US 8,555,356 B2
(45) Date of Patent: *Oct. 8, 2013

(54) NETWORK-AGNOSTIC CONTENT MANAGEMENT

(75) Inventors: Judson John Flynn, Decatur, GA (US); Erick John Haughn, Norcross, GA (US); John Lewis, Lawrenceville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 10 days.

This patent is subject to a terminal disclaimer.

(21) Appl. No.: 13/299,078

(22) Filed: Nov. 17, 2011

(65) Prior Publication Data

US 2012/0331537 A1 Dec. 27, 2012

Related U.S. Application Data

(63) Continuation of application No. 12/209,940, filed on Sep. 12, 2008, now Pat. No. 8,082,576.

(51) Int. Cl.
*H04L 9/32* (2006.01)
*G06F 21/00* (2006.01)

(52) U.S. Cl.
USPC .................................................. 726/5; 726/3

(58) Field of Classification Search
USPC .......................................................... 726/7, 5
See application file for complete search history.

(56) References Cited

U.S. PATENT DOCUMENTS

| 6,108,787 | A | 8/2000 | Anderson et al. |
| 8,082,576 | B2 * | 12/2011 | Flynn et al. ........................ 726/5 |
| 2002/0184527 | A1 | 12/2002 | Chun et al. |
| 2004/0143628 | A1 | 7/2004 | Bradford et al. |
| 2005/0114442 | A1 | 5/2005 | Hardwick et al. |
| 2007/0005600 | A1 | 1/2007 | Dutta et al. |
| 2008/0046984 | A1 * | 2/2008 | Bohmer et al. ................... 726/5 |
| 2008/0270569 | A1 * | 10/2008 | McBride et al. ............... 709/217 |
| 2009/0174550 | A1 * | 7/2009 | Aninye et al. ............ 340/539.13 |
| 2010/0036939 | A1 * | 2/2010 | Yang et al. ..................... 709/224 |

OTHER PUBLICATIONS

OA dated May 13, 2011 for U.S. Appl. No. 12/209,940, 30 pages.

* cited by examiner

*Primary Examiner* — Matthew Smithers
(74) *Attorney, Agent, or Firm* — Turocy & Watson, LLP

(57) ABSTRACT

System(s) and method(s) are provided for content management, e.g., exchange and manipulation, across devices provisioned through disparate network platforms. Devices can be mobile or stationary, and connect to provisioning network platforms through various network bearers. Through various secure protocols, a client component within a device secures access to content and provides secure delivery thereof. Directives for content manipulation are also delivered securely. Delivery of contents and directives are performed from device to device, routed via gateway nodes within a network platform that provisions the device. In addition, or alternatively, content management can be implemented through an intermediary component, which can also validate devices and secure delivery of content or directives. Alarm signaling among devices provisioned through disparate network platforms also can be securely conveyed. Intermediary component also can be exploited for content management among subscribers of disparate network providers.

20 Claims, 15 Drawing Sheets

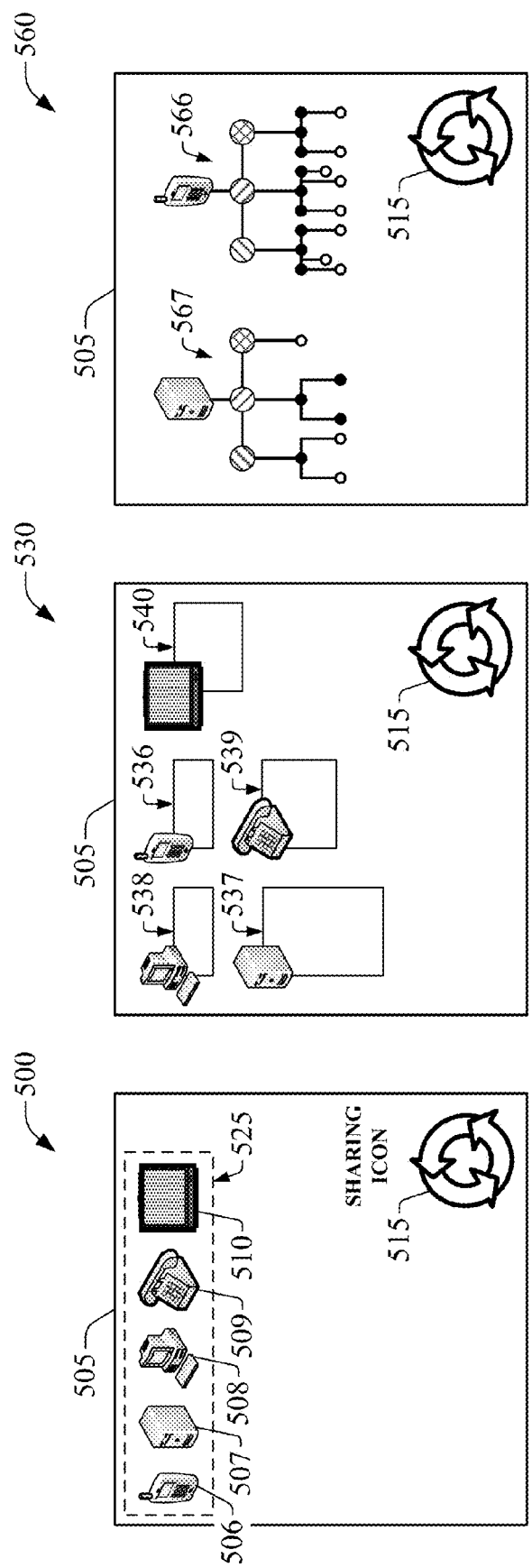

NETWORK-AGNOSTIC CONTENT MANAGEMENT

CROSS REFERENCE TO RELATED APPLICATIONS

This application is a continuation of U.S. patent application Ser. No. 12/209,940, filed on Sep. 12, 2008, entitled "NETWORK-AGNOSTIC CONTENT MANAGEMENT." The entirety of the aforementioned application is incorporated by reference herein.

TECHNICAL FIELD

The subject innovation relates to networked communications and, more particularly, to content management, e.g., exchange and manipulation, across devices provisioned through disparate networks.

BACKGROUND

Technological advances have provided various sectors of society like government, industry, health care, law enforcement and security, education, commerce and entertainment with access to networked information in order to increase operational and commercial efficiencies. Illustrative examples of such efficiencies are centralized billing; on-demand services; centralized content storage; access to cross-linked, network-wide databases; always-on access to service(s) and content(s); and so forth. Networks of devices, mobile or otherwise, within one or more sectors consume and generate information that is retained within the network. Networked devices within a network typically are provisioned through a specific network platform, wherein the network platform generally administers information access among the devices. Even though various sectors can share information, the networked information is primarily accessed vertically; namely, devices within a network platform can access content straightforwardly whereas cross-network platform information exchange is substantially mitigated. Thus, management of content within a network is generally referred to as obeying a "silo" paradigm of content dissemination and access. Such a silo paradigm can largely hinder operational and commercial synergies in connection with the foregoing efficiencies among network platforms and network operators.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject innovation provides system(s) and method(s) for content management, e.g., exchange and manipulation, across devices provisioned through disparate network platforms. Devices can be mobile (e.g., cellular telephone) or stationary (e.g., a personal computer, or digital video recorder), and connect to provisioning network platforms through various network bearers. Devices can have distinct functionalities geared to disparate operational environments and conditions (e.g., industrial, medical, personal . . . ). Through various secure protocols such as Internet Protocol Security (IPsec), Secure Socket Layer (SSL), Transport Layer Security (TLS), Secure Shell (SSH), Secure File Transport Protocol (SFTP), Secure Copy (SCP), etc., a client component within a device secures access to content and provides secure delivery thereof Directives for content manipulation are also delivered securely. For devices that connect to a network platform through a network interface, rather than directly via a network link, the client component that secure content(s) and its delivery can reside within the network interface. Delivery of contents and directives are performed from device to device, routed via gateway nodes within network platforms that provision the devices. In addition, or alternatively, content management can be implemented through an intermediary component, which can also validate devices and secure delivery of content or directives. At least one advantage of content management across devices provisioned through disparate networks is to realize, at least in part, cross-network or non-silo oriented information exchange.

Additionally, in the subject innovation, alarm signaling among devices provisioned through disparate network platforms also can be securely conveyed. The alarm signaling can be triggered in accordance with predetermined alarm criteria related to device performance or operation characteristics. Alarm criteria can be established by an end user based at least in part on user's location, or content associated with an alarmed device.

Moreover, intermediary component also can be exploited for content management among subscribers of disparate network providers. The subscribers can exploit devices, wireless or otherwise, provisioned via disparate network platforms associated with respective service providers or network operators. The intermediary component validates security credentials and secures content exchange and manipulation across disparate communication platforms operated by disparate network operators. Content management across disparate communication platforms further realizes, at the very least, non-silo oriented information exchange and delivery.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF DRAWINGS

FIGS. 5A-5C illustrate diagrams of example display user interfaces for networked content management in accordance with aspects described herein.

DETAILED DESCRIPTION

Figure 1:
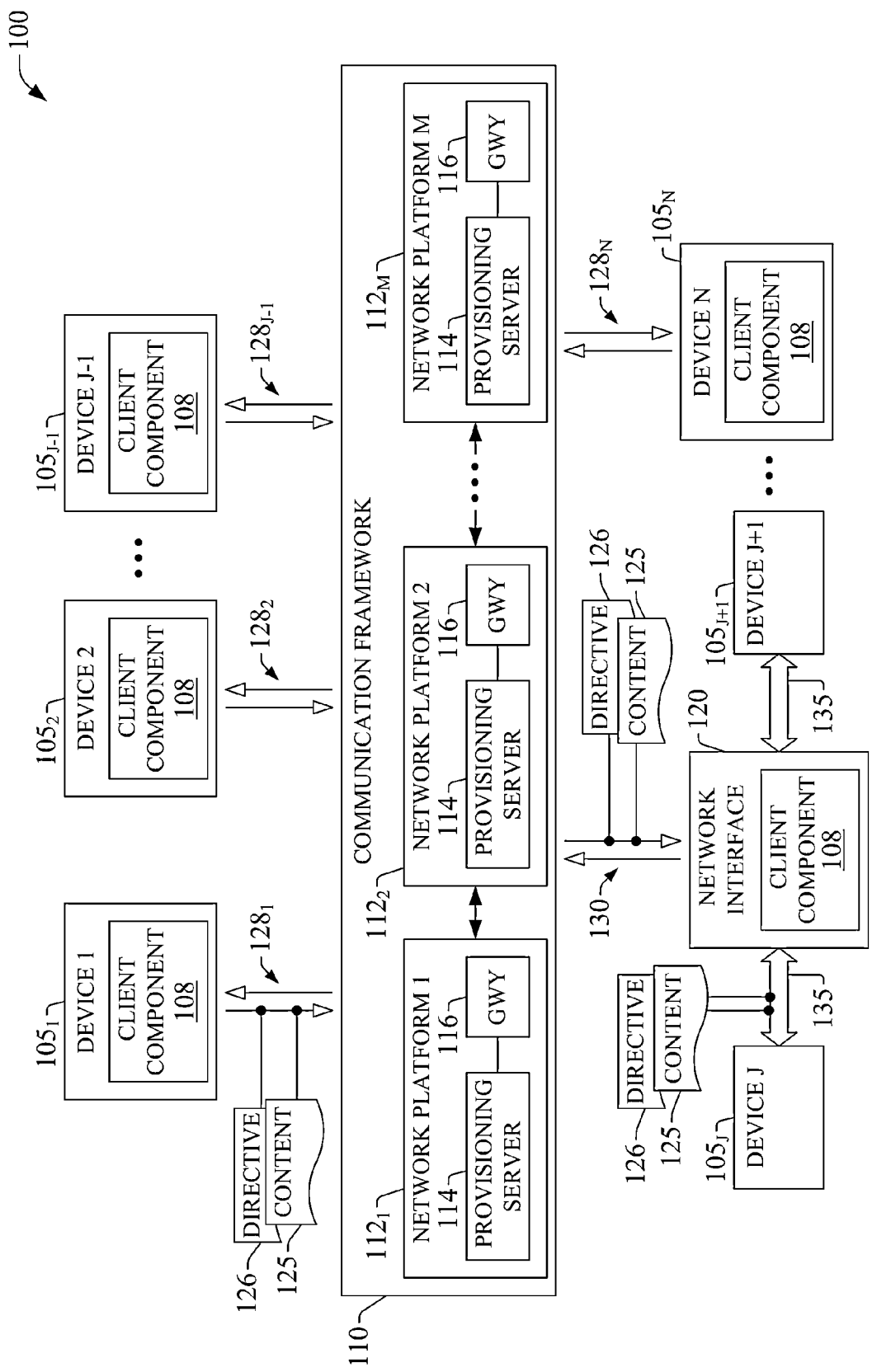
FIG. 1 is a block diagram of an example system that facilitates management of content among a set of devices provisioned by disparate network platforms in accordance with aspects described herein.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," "service," "framework," "interface," "node," and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "access terminal," "terminal," "mobile handset," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming data, or substantially any data-stream or signaling-stream from a set of subscriber stations. Data (e.g., content or directives) and signaling streams can be packetized or frame-based flows.

Furthermore, the terms "user," "subscriber," "customer," "consumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inferences based on complex mathematical formalisms) which can provide simulated vision, sound recognition, and so forth.

FIG. 1 is a block diagram of an example system 100 that facilitates management of content among a set of devices $105_1$-$105_N$ provisioned by disparate network platforms $112_1$-$112_M$. (N and M are positive integers.) Management includes exchange of content 125, and remote transmission of a directive 126 for content manipulation. Devices $105_1$-$105_N$ can include wireless or tethered devices, which can be located is disparate geographic areas. A device is typically an electronic appliance with a set of specific enabled or capable functionalities (e.g., communication-oriented, control-oriented, image and sound display-oriented, computation-oriented, storage oriented . . . ), and operational resources (e.g., display size and type, computing power associated with a processor like a computing processing unit or graphic processing unit that resides within the device; memory structure and type (e.g., hard-drive aspects) determined at least in part by a memory present in the device; access to peripherals, and so on. It should be appreciated that a single device can combine various functionalities. In an aspect, a device implements its one or more functionalities through a set of components to which a processor, assisted through memory element(s), confers at least part of the device's components functionalities. Illustrative examples of devices are a mobile handset, tethered devices like a personal computer (PC), a digital video recorder (DVR), a voice over internet protocol telephone, an internet-protocol television (IPTV) display set, a digital camera, an audio-visual or data projector, a television set, a gaming console either wired or wirelessly connected (e.g., through link 135) to a network platform via a network interface (e.g., network interface 120). In addition, devices can also include industrial manufacturing and processing components such as miniaturized solid-state electronics deposition (e.g., molecular beam epitaxy, chemical vapor deposition) and processing (e.g., photolithographic equipment) chambers; high-pressure chambers, or isolation and containment chambers; welding and painting robots; assembly robots; food processing components such as freezing tunnels and chambers; pipelines flow controllers; annealing, melting or cooking ovens; transportation and product separation conveyers; and so on. Moreover, depending on network platforms, devices can include health performance indicator monitors; ultrasound, echography, endoscopy, and radiology equipment; infant incubator monitoring equipment; and so on.

In system 100, devices $105_1$-$105_{J-1}$ and $105_{J+2}$-$105_N$ (J a positive integer) can communicate directly with network platforms that provisioned the devices in said subset through communication links $128_1$-$128_{J-1}$ and $128_{J+2}$-$128_N$, while a disparate subset of devices $105_J$ and $105_{J+1}$ communicate through a network interface 120, which communicates with a network platform via link 130. One or more of links $128_\lambda$ ($\lambda=1, J-1, J+2 \ldots N$) or 130 can be wireless or wired, and include uplink and downlink elements. In an aspect, wired links can include T1/E1 phone line; a digital subscriber line (DSL) either synchronous or asynchronous; an asymmetric DSL (ADSL); an optical fiber backbone; a coaxial cable, etc., whereas wireless links can be line-of-sight (LOS) links or a non-LOS links, which can include terrestrial air-interfaces or deep space links. Devices attached to network interface 120 can be linked thereto via a wired or wireless link component 130: wired link component 130 includes single- or multi-line twisted-pair lines, such a FireWire bus; a general purpose interface bus (GPIB) line; Universal Serial Bus (USB) connectors, recommended standard (RS)-232 connectors; Ethernet connectors; digital visual interface (DVIs) cables; high-definition multimedia interface (HDMI) cables; and so forth. Wireless link component 130 can include LOS links such as wireless infrared (IR); or non-LOS links. It should be appreciated that the number of devices that communicate directly or indirectly, via a network interface, can be different from the illustrative example presented in system 100. In system 100, communication framework includes network platforms $112_1$-$112_M$ which provision substantially all devices.

In communication framework 110, network platforms $112_1$-$112_M$ can include mobile networks (e.g., Third Generation Partnership Project Universal Mobile Telecommunication System (3GPP UMTS), Enhanced Data Rate for Global System for Mobile Communications (GSM) Evolution (EDGE), 3G Long Term Evolution (LTE), Ultra-broadband Mobility (UMB), Worldwide Interoperability for Microwave Access (WiMax), Wi-Fi); telephony networks (e.g., public switched telephony network (PSTN); internet protocol-based networks (e.g., internet service network, IP multimedia service network); broadband networks (e.g., DSL internet service network, cable television network); local area networks (e.g., enterprise networks like industrial machinery networks, or hospital instrument networks). It is to be noted that a network platform for a mobile network includes the radio access network (RAN) which comprises access points and the air interface. It should be appreciated that network platforms $112_1$-$112_M$ can be operated by a single service provider. A subset of network platforms $112_1$-$112_M$ can provide mobile communication through disparate wireless communication technologies; e.g., network platform $112_2$ exploits EDGE technology while network platform $112_1$ exploits WiMax technology. Network platforms $112_1$-$112_M$ include respective provisioning server(s) 114 and gateway (GWY) component(s) 116. In an aspect of the subject innovation, once a device has been provisioned, a gateway component 116 in the provisioning network platform broadcasts device information (e.g., a serial number or product code that identifies the device, secure system identity module (SIM) information for mobile devices . . . ) to a gateway component 116 in disparate network platforms within communication platform 110. Provisioned device information available to disparate networks facilitates routing of point-to-point (e.g., device-to-device) secure access requests among devices provisioned, and served, through disparate networks; e.g., device $105_1$ provisioned through network platform $112_2$ conveys a request for secure access to device $105_N$ provisioned through network platform $112_M$. For devices that communicate directly with their provisioning network platform(s), a respective client component 108 effects secure communication. For devices like $105_J$ and $105_{J+1}$, which communicate with their provisioning network through network interface 120, client component 108 can reside within the network interface 120. Once a secure communication access request is granted, content(s) 125 and directive(s) 126 can be exchanged among devices engaged in secure communication. It is to be noted that in the subject innovation, management of device content is network platform agnostic. Device content 125 and directive 126 can be communicated across disparate network platforms 1121-$112_M$, which exploit disparate means of connection for communication; e.g., links $128_\lambda$, 130, and 135. At least one advantage of network agnostic content management across devices provisioned through disparate networks is to realize, at least in part, cross-network or non-silo oriented information exchange.

As an example of content management among disparate networked devices, device 1 $105_1$ can be a mobile handset that is provisioned through network platform 1 $112_1$, a mobile network platform (e.g., cellular 3GPP UMTS network, or a Wi-Fi network), and device J $105_J$ can be a PC that is provisioned by network platform M $112_M$, which can be a broadband network (e.g., DSL network) the delivers packetized traffic. It should be appreciated that device J $105_J$ can be an industrial equipment or medical equipment and network platform M $112_M$ can be an enterprise network like a factory plant or hospital network. Device J $105_J$ is connected to the network platform via network interface 120, which can communicate with network platform M $112_M$ through link 130. An end user of device 1 $105_1$, located remotely from device J $105_J$, can request secure access (e.g., via client 108) to device J $105_J$, and retrieve, or download, Moving Picture Experts Group Phase 1 (MPEG-1) audio layer 3 (MP3) files from device J $105_J$ once access is granted (e.g., via client component 108 in network interface 120). In an aspect, request for secure access can be initiated, after device $105_1$ is operational and connected to the network platform, by an icon indication in a device (e.g. mobile handset) user interface (e.g., a display). Once access is granted, a set of contents available for download in device J $105_J$ are made visible to the end user in the device interface, and download or manipulation of content can be effected. In addition, in view that in an aspect of the subject innovation substantially all provisioned devices associated with a subscriber are available to network platform $112_1$ (e.g., mobile network) that provisioned device 1 $105_1$ (e.g., mobile handset), end user can be provided with a catalog of devices available for access and manipulation of contents. It is to be noted that exchange of content among a mobile and an IPTV interface can occur in substantially the same manner as in the foregoing example.

Network platforms $112_1$-$112_M$ include components that facilitate data generation and delivery in accordance with modulation and multiplexing modes specific to the type of service(s) provisioned by the network platform. In particular, in addition to provisioning server 114 and gateway component 116, network platforms $112_1$-$112_M$ can include application server(s), billing component(s), operation and maintenance component(s), interfaces between data generation components (e.g., cameras that capture live events such as a football game, or a political speech) and data delivery components, and so on. In an aspect of the subject innovation, network platform(s) that facilitates wireless communication includes components, e.g., nodes, gateways, and interfaces, that facilitate packet-switched (PS) (e.g., internet protocol (IP), or asynchronous transfer mode (ATM) cell relay protocol) and circuit-switched (CS) traffic and control generation for network wireless communication through one or more technologies. In addition, as indicated above, for network platform(s) associated with wireless service, radio access network is included within the network platform; the RAN includes various base stations and access points for substantially any type of over-the-air coverage (e.g., disparate multiplexing and modulation schemes, and various modes for data stream delivery like multiple-input multiple output mode) with disparate spatial extents, e.g., macro (typically outdoors), micro (confined outdoor spaces like parking lots, or indoor spaces such as a library, a hospital, a retail store, a residence . . . ), or femto (indoor spaces) cell coverage, or any combination thereof. A processor (not shown) that resides within each network platform $112_1$-$112_M$ typically provides, at least in part, the functionality of substantially any component within the network platform, while a memory (not shown) can retain data structures, code instructions, and algorithms related to such functionality; the processor is configured to exploit contents (e.g., execute code instructions) that reside within the memory in order to provide specific functionality to the network platform.

Figure 2:
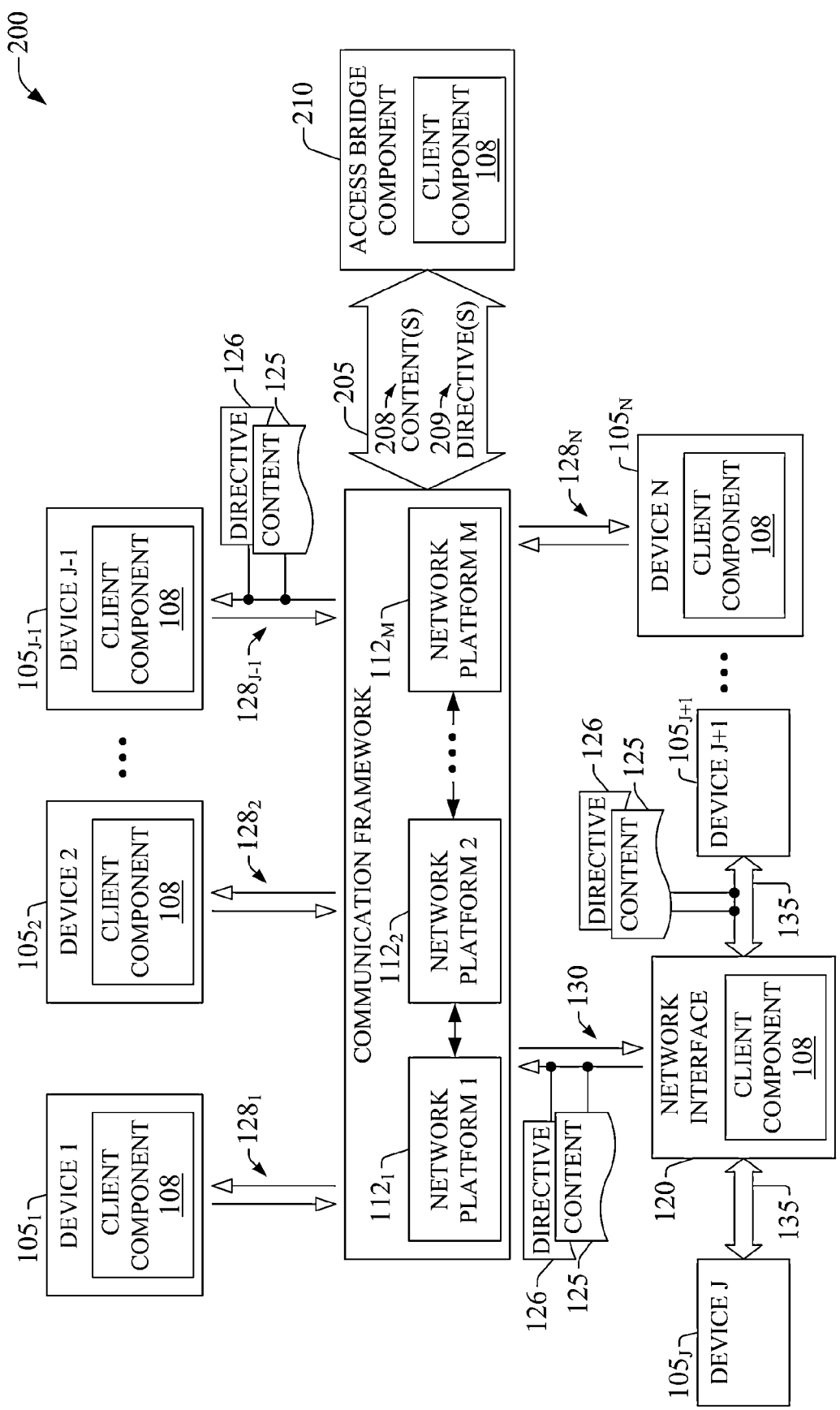
FIG. 2 is a block diagram of an example system that facilitates management of content among a set of devices, provisioned by disparate network platforms, through an intermediary or pass-through component in accordance with aspects described herein.

FIG. 2 is a block diagram of an example system 200 that facilitates management of content among a set of devices $105_1$-$105_N$, provisioned by disparate network platforms $112_1$-$112_M$, through an intermediary or pass-through component. In example system 200, components with like numerals as those in example system 100 have substantially the same functionality thereof Intermediary component is an access bridge component 210 that can receive, via link component 205, content(s) 208 and directive(s) 209 from devices $105_1$-$105_N$, and relay such content(s) 208 and directive(s) 209 to one or more destination devices. Access bridge component 210 can link networked mobile devices, or a stationary networked devices (e.g., a device with a definite, fixed internet protocol address) to one or more networked mobile devices, the stationary and mobile devices provisioned through disparate networks. It should be appreciated that such link can be established regardless of a network bearer (e.g., wireless link(s), or wired link(s)) that the mobile(s) or stationary device(s) utilize for network communication. Access bridge component 210 receives and conveys content(s) and directive(s) securely. In an aspect, access bridge component 210 receives request to deliver content(s) 208 and directive(s) 209, and centrally validates security credentials of a subset of provisioned devices $105_1$-$105_N$ that elect to access content remotely; for instance, access bridge component 210 can act as a certificate authority, which can generate and receive certificates from each device in the subset of devices $105_1$-$105_N$ and verify the certificates—certificates, or digital certificates, are typically electronic credentials (e.g., codes, labels, tokens, encrypted or otherwise) that are used to certify identities of components in a network (e.g., servers, peripherals, etc) and operator agents as well. A client component 108 that can reside within access bridge component 210 conducts the validation. As illustrated in example system 200, device $105_{J+1}$ can convey content 125 and directive 126 to network interface 120, which can relay the content 125 and directive 126 to the access bridge component 210, which in turn can relay the content 125 and directive 126 to device $105_{J-1}$; transport of content 125 and directive 126 thereto can be effected via link(s) $128_{J-1}$.

Once a device in the subset of devices that opted to access content remotely is validated, the device can view, download, and manipulate content(s) from substantially any validated device in the subset of devices. In addition, the device can upload, through access bridge component 210, content(s) 208 to substantially any of the devices that elected to access content remotely.

Figure 3:
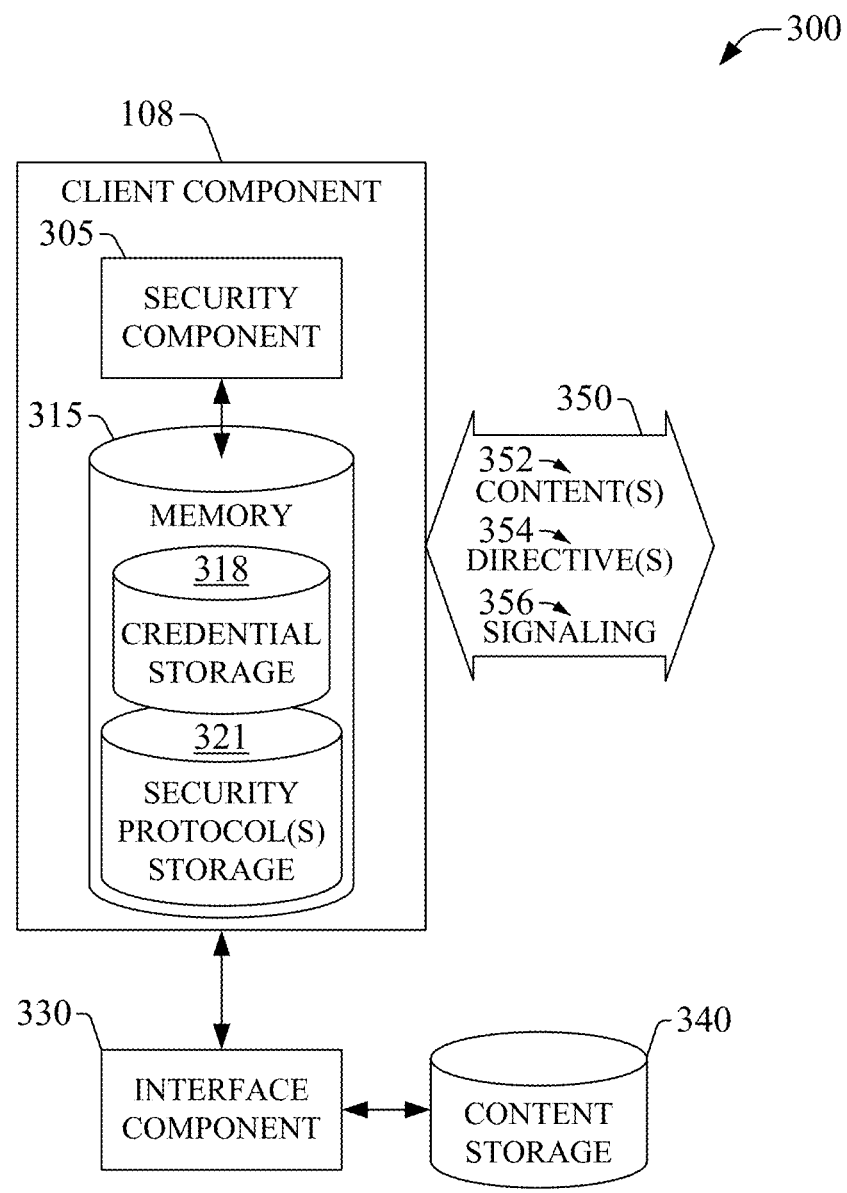
FIG. 3 illustrates an example embodiment of a component that facilitates content management across networked devices provisioned through disparate networks in accordance with aspects described herein.

FIG. 3 is an example embodiment 300 of a client component 108 that facilitates content management (e.g., access and manipulation) across networked devices provisioned through disparate networks. Client component 108 can employ security component 212 to securely deliver and receive content(s) 352, directive(s) 354, and signaling 356 via link component 350. Signaling can comprise (i) credentials and instructions, or indications, to implement, at least in part, secure attachment and content management, and (ii) data (e.g., IP addresses) that provide routing information such as logical addresses of access ports associated with a device, or other identification information thereof. In addition, client component 108 includes memory 315, which can comprise credential storage 318 (e.g., a register or a stack) and security protocol(s) storage 321 (e.g., a register or a stack). It should be appreciated that link component 350 has substantially the same aspects as link $128_\lambda$, 130 and 135. A processor (not shown) can provide at least in part the functionality of client component 108 and components that reside thereon.

To facilitate secure delivery, security component 305 administers secure attachment with a provisioned device, and maintains a secure communication through link component 350. To implement secure attachment, and delivery and access of content(s) 352 and directive(s) 354, security component 305 can utilize a set of security protocols, or mechanisms, which can be retained in security protocols(s) storage 321. In addition, security component 305 can exploit security credentials, or credentials, that reside in credential storage 318. Credential(s) can include substantially any code or token, or light weight file (e.g., digital certificate) that identifies a device uniquely; for instance, passwords, public and private encryption keys, etc. Security protocols can include at least one of encryption, password protection, or biometric locking (e.g., information access through an authorized or registered biometric instrument like fingerprint(s) or iris pattern, voice profile, or any combination thereof). As an example, security protocols retained in security protocol(s)

storage can include, but are not limited to, Internet Protocol Security (IPsec), Secure Socket Layer (SSL), Transport Layer Security (TLS), Secure Shell (SSH), Secure File Transport Protocol (SFTP), Secure Copy (SCP), and so forth. It is to be noted that security component 305 can exploit one or more of the illustrative security protocols to establish a virtual private network (VPN) for device-to-device tunnel of content(s) and directive(s).

Client component 108 can manage interaction with an end user or agent via interface component 330, which is typically associated with a device that includes the client component 108. Information generated through such interaction can be conveyed to, and utilized by, client component 108. In an aspect of the subject innovation, interface component 330, which can be accessed by an agent, can provide content(s) 352 and directive(s) 354 via various instruments (e.g., via a keyboard, touch screen, microphone, biometric pad, camera(s), speakers . . . ) for data input and data output. For example, a camera that resides in a device (e.g., device $105_{j-1}$) can embody, at least in part, a data entry interface; captured images (e.g., a static frame(s), or dynamic multi-frames or movie) with the camera can be conveyed securely through client component 108. In addition, interface component 330 can display content that is available for networked access and manipulation via visual or aural indicia, or tactile interaction such as touch-based navigation. Such a catalog of content(s) can be rendered in accordance with various schemes (e.g., windows-based schemes such as iconic representation, pop-up representation; or text-based representation, with scroll-down or scroll-sideways delivery, or static rendering).

Contents like image and movie files, sound files, text-based files, system and log files that are available for networked access and manipulation can be stored in a memory element such as content storage 340.

Figure 4:
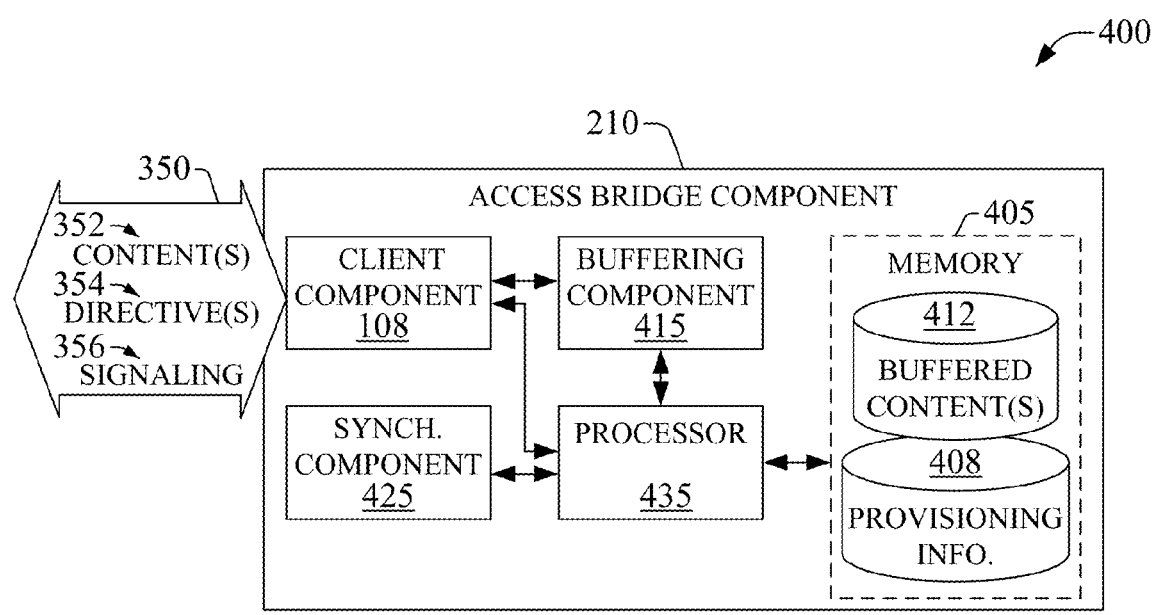
FIG. 4 is a block diagram of an example embodiment of an intermediary component that facilitates content management across devices provisioned through disparate networks in accordance with aspects described herein.

FIG. 4 is a block diagram of an example embodiments 400 of access bridge component 210 in accordance with aspects described in the subject specification. In example embodiment 400, client component 108 operates in substantially the same manner as described hereinbefore. Particularly, client component receives signaling 356 associated with security protocols employed to validate client devices, and securely receive and deliver content(s) 352 and directive(s) 354.

In addition, access bridge component 210 can receive provisioning information through signaling 356. In an aspect, a gateway component 116 within a network platform that provisions a device can convey provisioning information to access bridge component 210; provisioning information can include context data, or logic address(es) associated with the device. Such information further facilitates device validation and affords routing of content(s) 352 and directive(s) 354 from an originator device to a destination device. Provisioning information can be retained in memory 405, within a provisioning information storage element (e.g., a register or stack) 408.

Access bridge component 210 also can include a buffering component 415 that manages content(s) 352 and directive(s) 354 conveyed to a destination device that is not operationally available, e.g., the device is offline, or operating in a poor radio link environment in the case of devices provision via a mobile network platform. In an aspect, buffering component receives signaling 356 associated with operation availability of validated devices, and when such devices are unavailable, content(s) 352 and directive(s) 354 are retained in a buffered content storage element 412 within memory 405. Buffering component can relay buffered content(s) 352 and directive(s) 354 once a destination device becomes operational, as reflected by received signaling 356. It should be appreciated that buffering component 415 also can reside within client component 108.

In example embodiment 400, access bridge component 210 also can include a synchronization component 425 that updates buffered content(s) in accordance with alterations effected in the content(s) in an originator device. In an aspect, synchronization component 425 can probe, e.g., at specific time intervals via signaling 356, the originator device to determine whether previously received content(s) 354 that are buffered have been modified. When a specific content(s) has been modified, the updated content(s) is retrieved from the originator device and retained in buffered content(s) storage 412.

It should be noted that in example embodiment 400 of access bridge component 210, processor 425 provides at least in part the functionality of client component 108 and buffering component 415. Data structures, code instructions, and algorithms (not shown) related to such functionality can be stored in memory 405 and utilized by processor 425.

FIGS. 5A-5C illustrate diagrams of example display user interfaces (DUIs) for content management in accordance with aspects described herein. A DUI is a part of interface component 330, and aspects or features of a DUI are generally dictated by operational resources available to interface component 335 in a device. For example, a DUI can be embodied in a display area in a monitor (e.g., a cathode ray tube (CRT) monitor, a Liquid Crystal Display (LCD) monitor, a plasma monitor, an electrochromic monitor, and so on) that renders video image(s) from IPTV stream(s) delivered through an IPTV interface, or images from a personal computer, mobile computer, a mobile station, etc. FIG. 5A illustrates diagram 500 of a DUI that includes a rendering area 505 that displays a sharing icon 515 and networked devices 525 that are available for networked content management. Illustrative networked devices 525 include a mobile station 506, a data storage unit 507, a personal computer 508, a VoIP telephone 509, and an IPTV interface 510. Appearance of sharing icon 515 can be customized by an end user, or it can be set to an enterprise symbol that identifies a network operator that serves the networked devices 525. Sharing icon 515 can be actuated through various navigation gestures, such as one or more mouse or joystick clicks, a tap in case rendering area 505 is a touch screen, a hover of an object such as an end user's hand, etc. Actuation can lead to a navigation display (e.g., DUI 530 or DUI 560) that facilitates access to content and manipulation thereof. Actuation can be effected after secure authentication (e.g., digital authentication, or biometric authentication) in order to introduce a layer of security to prevent access of unauthorized agents to a content management navigation display.

FIG. 5B illustrates diagram 530 of an example DUI that includes a rendering area 505 that displays a sharing icon 515 and contents 536-540 available for a set of respective networked devices. In an aspect, DUI 535 can embody a navigation display for DUI 500 that facilitates content management. Contents 536-540 associated with a set of networked devices can be accessed via various gestures (e.g., click, touch, voice command . . . ); or downloaded via drag-and-drop gestures to a device that operates DUI 530. In addition, content(s) that reside in the device that operates DUI 530 can be uploaded through drag-and-drop operations. Accessed contents can be manipulated, e.g., deleted, altered and saved. It should be appreciated that when content is accessed (e.g., viewed), operational resources of the device from which content is accessed are utilized to deliver the content.

FIG. 5C is a diagram 560 of an example DUI that includes a rendering area 505 that displays a sharing icon 515 and contents of networked devices; e.g., data server 507 and mobile station 506. In an aspect, DUI 560 can be an alternative, or additional, navigation display for DUI 500 that facilitates content management. In DUI 560, contents in networked devices are displayed in tree structures. Contents in a tree structure can be arranged in accordance with logical structure of the contents, to provide with a logical representation of available content (e.g., a file system). As an example, for device 507, a tree 567 presents three root nodes, which can represent work related contents (e.g., right-hatched node), personal contents (e.g., left-hatched node), and content that needs substantial attention (e.g., cross-hatched node), like a commonly termed "to-do list." Category nodes (e.g., solid circles) represents groups of logically related contents (e.g., movies, reports, and so on), while leafs (e.g., open circle nodes) of a content-tree can be specific files that correspond to a category node. A similar tree representation 566 of content in mobile station 506 can be rendered. At least one advantage of a tree representation of content is that content structure generally can be device dependent (e.g., file system structure of a PC computer can be substantially different than structure of recorded content units in a DVR), thus a tree structure can provide for an intuitive representation that is device independent and enhances simplicity of content transfer and manipulation.

Figure 6A:
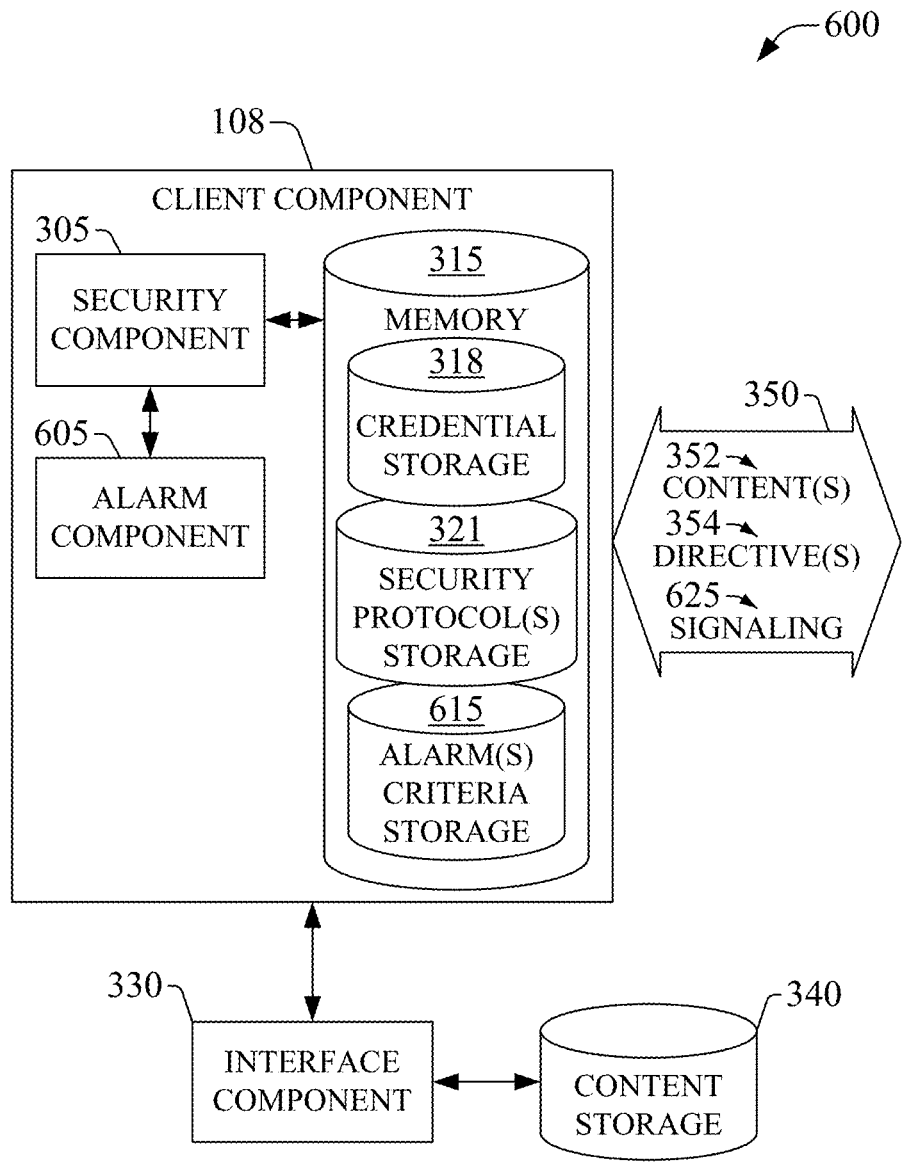
FIGS. 6A and 6B illustrate example embodiments of components to convey an alarm among networked devices provisioned through disparate networks in accordance with aspects described herein.
Figure 6B:
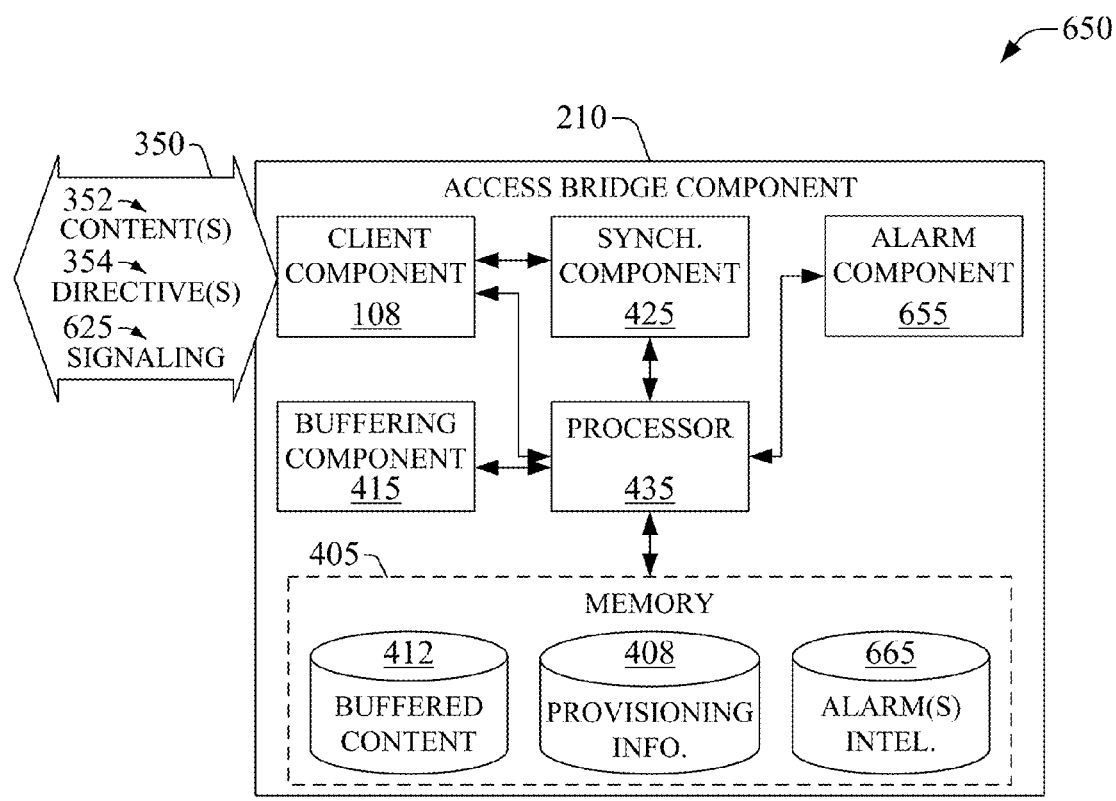

FIGS. 6A and 6B illustrate example embodiments 600 and 650 of a client component 108 and an access bridge component 210, respectively, to convey an alarm among networked devices provisioned through disparate networks. In FIG. 6A, components with like numerals as those illustrated in FIG. 3 have substantially the same functionality as discussed in connection with example embodiment 300. In embodiment 600, client component 108 includes an alarm component 605 that can convey an alarm indication as a part of signaling 625. The alarm indication can be triggered in accordance with a set of alarm criteria which can be determined by an agent and retained in alarm(s) criteria storage 615. Alarm criteria can be established for one or more of the devices $105_1$-$105_N$ which are provisioned by disparate networks. As an example, a DVR set can be alarmed to signal an alarm when specific content (e.g., a show with a "mature audience" rating, or violent interaction among individuals like a mixed martial arts fight . . . ) is programmed to be recorded. As another example, a data server can be alarmed to convey an alarm signal when specific file(s) are manipulated, e.g., moved to predetermined folders. As yet another example, a VoIP telephone can be alarmed to signal when a specific caller leaves a voice message. As a further yet example, an industrial device can be alarmed to indicate that specific performance indicators of the device are out of an adequate or safe operation range (e.g., a temperature of an annealing oven can be off a setpoint, or pressure of a tank containing a hazardous chemical can be above safety guidelines, and so on); or to convey a scheduled maintenance event at a specific time prior to the maintenance.

In an aspect, an alarm indication is signaled to one or more specific devices (e.g., a mobile phone), which can be determined by an end user based at least in part on (a) alarming criteria; (b) location, e.g., a vibration of a mobile device can be employed when an end user is located in an area in which noise level is regulated, or there is an expectation of maintaining low levels of noise; or (c) operational aspects of the networked provisioned devices, e.g., a device that is critical to an industrial process can trigger a substantially loud alarm. An alarm indication can be conveyed through various audio-visual messaging mechanisms; e.g., a SMS message, an MMS message, email communication, an IM, a ringtone(s) or a vibration(s), and so forth.

With respect to FIG. 6B, example embodiment 650 of access bridge component 210 includes substantially all components of example embodiment 400, in addition to an alarm component 655 which can retain alarm signaling from an originator device when a destination device is unavailable, and relay the alarm signaling when the destination device becomes available. In an aspect, alarm signaling, which can be a part of signaling 356, can be retained in alarm(s) intelligence storage element (e.g., a register or stack) 465. Alarm component 655 also can generate log records and reports of alarm signaling associated with an originator device, and store those records and reports within alarm intelligence storage 665. Such records and reports are actionable information that can be employed by an end user to identify patterns of utilization or performance of devices that convey alarm signaling. As an example, an alarm signaling report associated with a cable television hub-set can reveal that a housekeeping staff member utilizes the device to consume inappropriate on-demand programming while on duty. As another example, alarm reports associated with unauthorized utilization of a PC to generate internet traffic can show that children of the PC's owner access regularly website(s) that can compromise their safety or the privacy of the contents stored within the PC.

Figure 7:
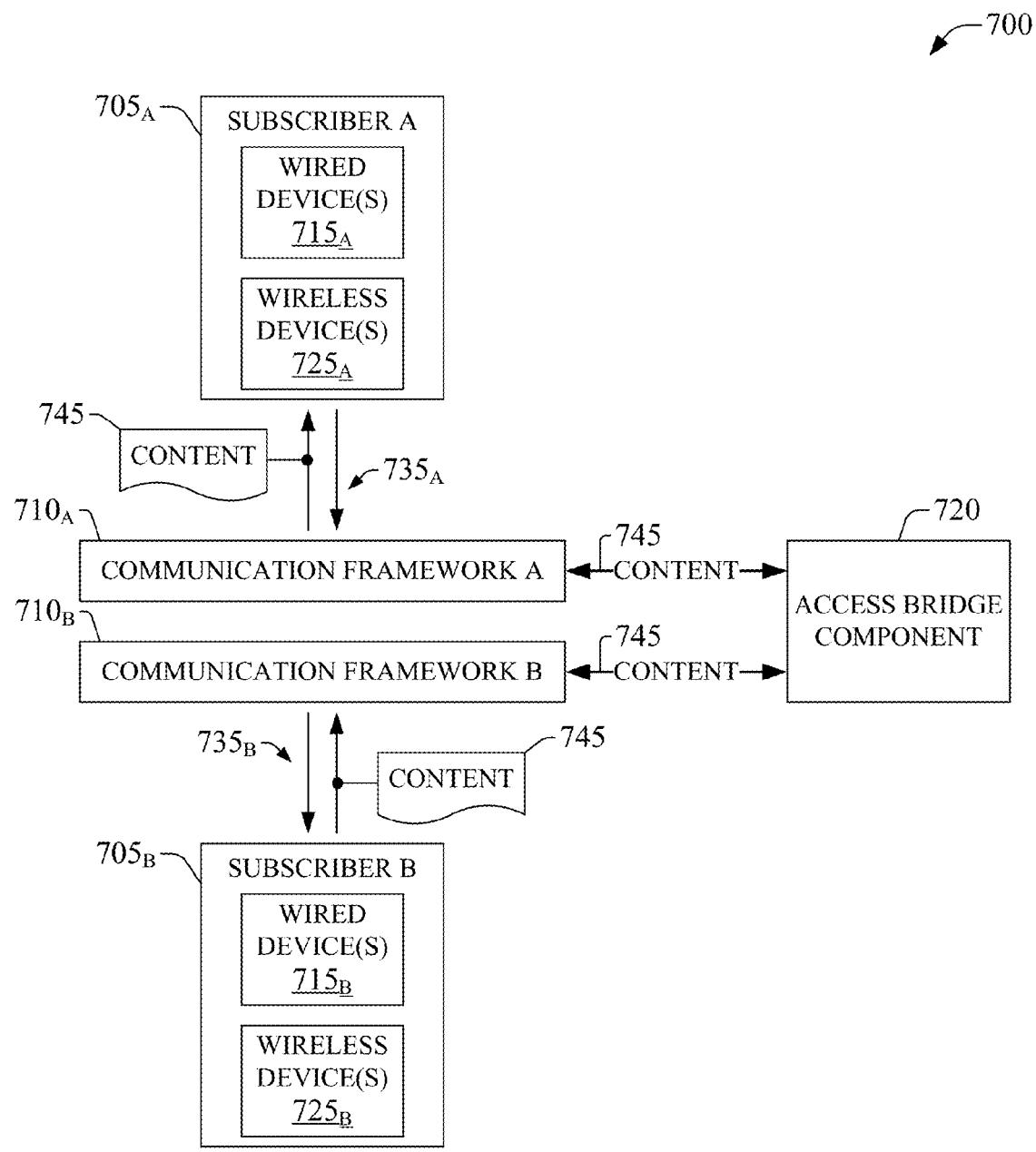
FIG. 7 is a block diagram of an example system that facilitates content management across networked devices provisioned through disparate network platforms operated by respective service provided in accordance with aspects described herein.

FIG. 7 is a block diagram of an example system 700 that facilitates content management among different subscribers that exploit networked devices provisioned through disparate communication frameworks operated by respective service provider. Subscriber A $705_A$ can utilize wired device(s) $715_A$ or wireless device(s) $725_A$ which are connected via disparate network connections 735A (e.g., one or more of link $128_\lambda$, or link 130 and network interface 120) to one or more network platforms within communication framework $710_A$. In an aspect, a first network operator serves communication framework $710_A$. Likewise, subscriber B $705_B$ can utilize wired device(s) $715_B$ or wireless device(s) $725_B$ which are connected via disparate network connections (e.g., one or more of link $128_\lambda$, or link 130 and network interface 120) to one or more network platforms within communication framework $710_B$. A second network operator can serve communication framework $710_B$. In example system 700, subscriber A $705_A$ can exchange content 745 with subscriber $705_E$ through access bridge component 720. In an aspect, content 745 can be conveyed securely to access component 720 once a device utilized to convey the content 745 is validated with the access bridge component 720. The content 745 is relayed securely by access bridge component 720 to a device utilized by subscriber B $705_B$, the device also validated with the access bridge component 720. In an illustrative scenario, subscriber A $705_A$ can be connected via a broadband network platform only, while subscriber B $705_B$ can only exploit communication through a mobile network platform, and content 745 can be exchanged among these subscribers through access bridge component 720. At the very least one advantage of example system 700 is to break, or mitigate, the paradigm of silos for networked content availability.

In view of the example systems described above, example methodologies that can be implemented in accordance with the disclosed subject matter can be better appreciated with reference to flowcharts in FIGS. 8-14. For purposes of simplicity of explanation example methodologies, or methods, are presented and described as a series of acts; however, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of inter-related states or events, such as in a state diagram, or interaction diagram. Moreover, not all illustrated acts may be required to implement a methodology in accordance with the subject specification. Additionally, it should be further appreciated that the methodologies disclosed hereinafter and throughout this specification are capable of being stored on an article of manufacture to facilitate transporting and transferring such methodologies to computers for execution by a processor or for storage in a memory.

Figure 8:
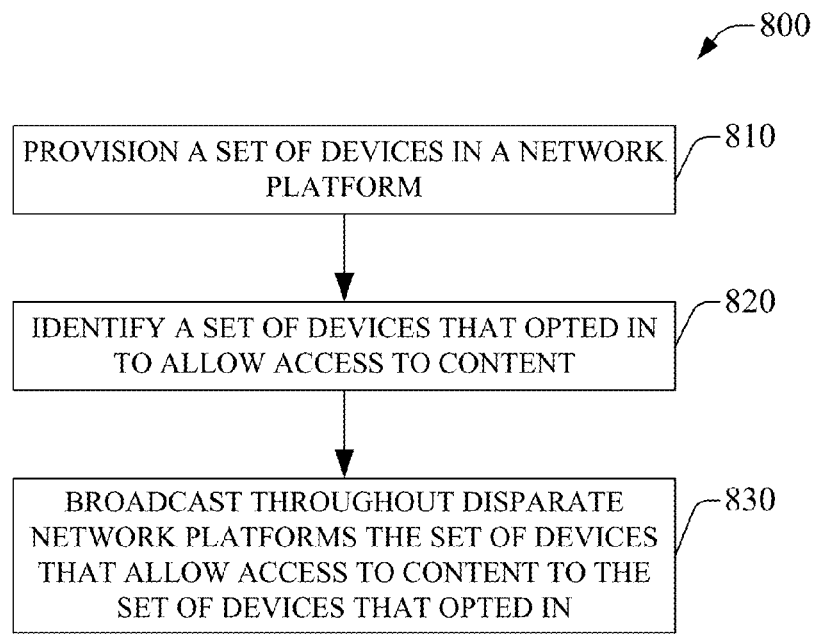
FIG. 8 is a flowchart of an example method for conveying throughout a set of disparate networks a set of devices that allow access to content in a network according to aspects described herein.

FIG. 8 is a flowchart of an example method 800 for making known throughout a set of disparate networks a set of devices that allow access to content in a network according to aspects described herein. At act 810, a set of devices in a network platform is provisioned. Network platform and devices can include those described above in connection with FIG. 1. At act 820, a set of provisioned devices that opted-in or elected to allow access to content is identified. In an aspect, identification can be provided via a gateway component within the disparate network platforms that provisioned the devices that elected to allow access content. At act 830, the set of devices that allow access to content to the set of devices that opted-in is broadcasted throughout disparate networks. Broadcasting includes communication of device identification (e.g., SIM credentials, serial number(s), product code(s)) and routing information (e.g., logical addresses), and can be implemented through network element(s) (e.g., gateway 116) associated with network platform(s) that provisioned the set of devices.

Figure 9:
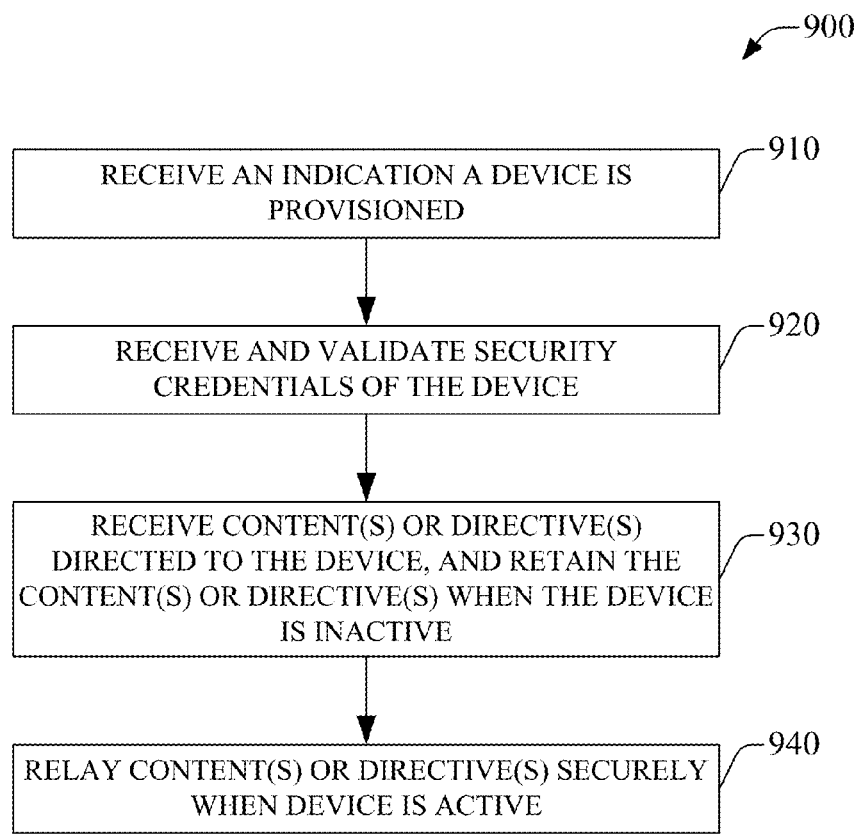
FIG. 9 is a flowchart of an example method for delivering buffered content to a device when the device is active according to aspects described herein.

FIG. 9 is a flowchart of an example method 900 for delivering content to a device when the device is active according to aspects described herein. At act 910, an indication a device is provisioned is received. In an aspect, a network element (e.g., provisioning server 114) can convey the indication the device is provisioned. At act 920, security credentials of the device are received and validated. The device generally elects to manage content remotely through disparate network platforms. In an aspect, security credentials can include at least one of passwords, encryption keys, digital certificates, biometric labels, or instruments, such as fingerprint(s) or iris pattern, voice profile, or any combination thereof. Validation of credentials can occur according to various security protocols such as for example Internet Protocol Security (IPsec), Secure Socket Layer (SSL), Transport Layer Security (TLS), Secure Shell (SSH), Secure File Transport Protocol (SFTP), Secure Copy (SCP), biometric locking (e.g., information access through an authorized or registered biometric instrument), and so forth. At act 930, content(s) or directive(s) directed to the device is received, and the content(s) or directive(s) are retained when the device is operationally inactive or unavailable. In an aspect, content can include multimedia files (e.g., photos in Joint Photographic Experts Group (JPEG) format), text-based files, etc. At act 940, content(s) or directive(s) are relayed securely when the device is available. In an aspect, contents are tunneled via a VPN established according to one or more of the foregoing security protocols.

Figure 10:
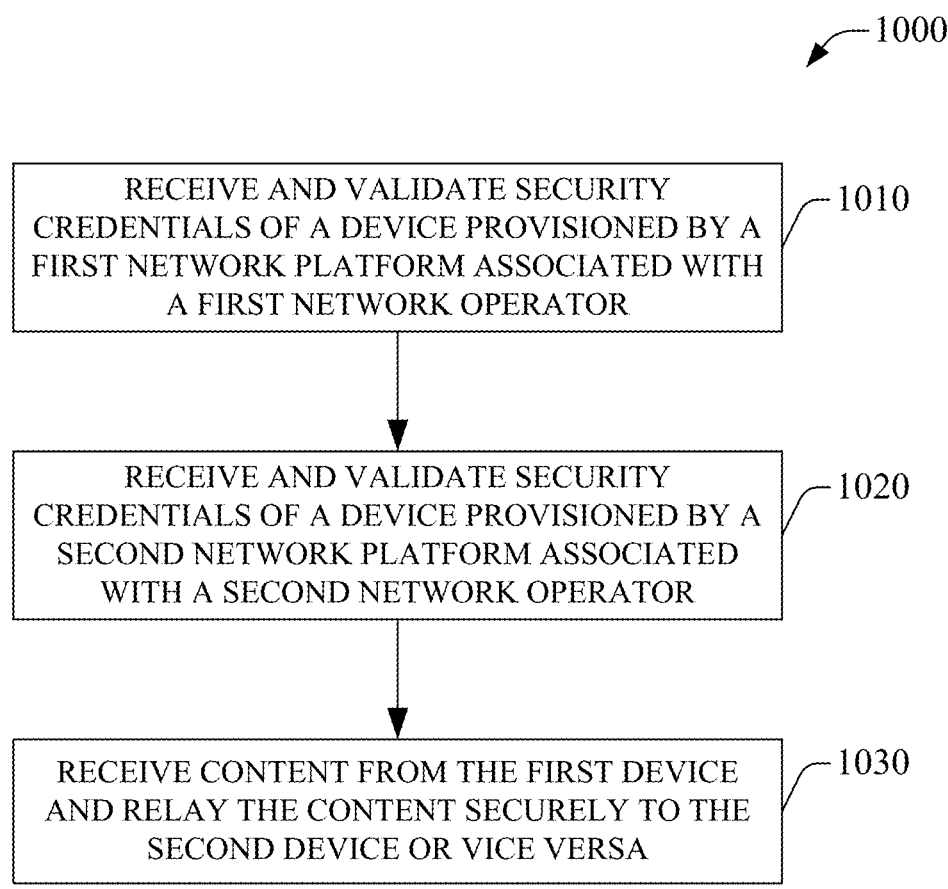
FIG. 10 is a flowchart of an example method for sharing content among devices provisioned by network platforms operated by disparate network operator according to aspects described herein.

FIG. 10 is a flowchart of an example method 1000 for sharing content among devices provisioned by network platforms operated by disparate network operator according to aspects described herein. At 1010, credentials of a device provisioned by a first network platform associated with a first network operator are received and validated. As indicated above, in an aspect, credentials can include at least on of passwords, encryption keys, digital certificates, biometric labels, or instruments, such as fingerprint(s) or iris pattern, voice profile, or any combination thereof. Validation of credentials can occur according to various security protocols such as for example Internet Protocol Security (IPsec), Secure Socket Layer (SSL), Transport Layer Security (TLS), Secure Shell (SSH), Secure File Transport Protocol (SFTP), Secure Copy (SCP), biometric locking (e.g., information access through an authorized or registered biometric instrument like), and so forth. At act 1020, credentials of a device provisioned by a second network platform associated with a second network operator are received and validated. Likewise, security credentials and validation protocol(s) are substantially the same as those described in connection with act 1010. In an aspect, an intermediary bridge component (e.g., access bridge component 210) effects validation of acts 1010 and 1020. At act 1030, content is received from the first device and relayed securely to the device or vice versa. Content can be relayed according to aspects, or features, of the security protocol(s) enacted by the intermediary bridge component.

Figure 11:
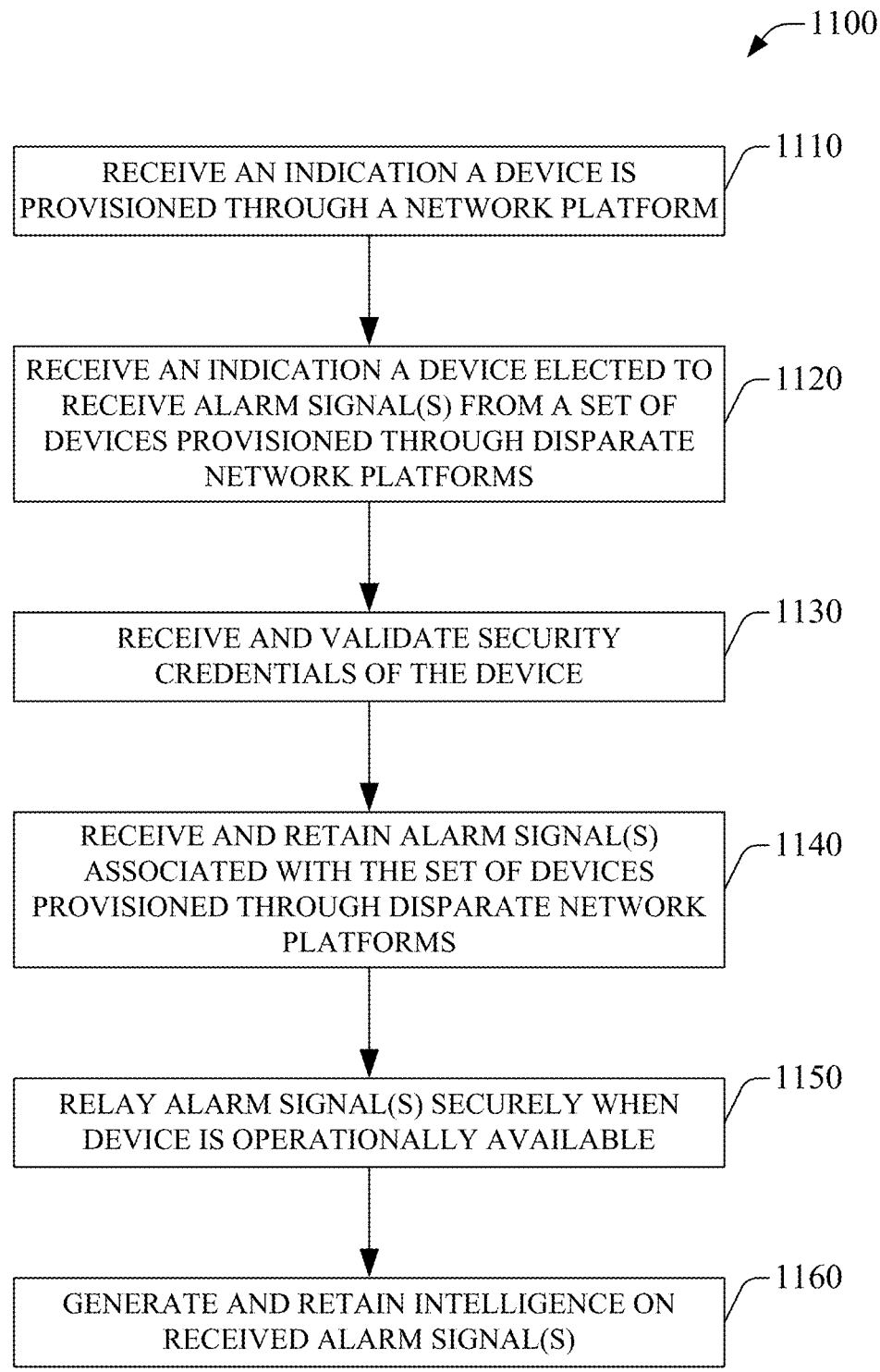
FIG. 11 is a flowchart of an example method for alarming a networked device through an intermediary component relaying alarm signaling from a set of disparate devices provisioned through a set of disparate network platform(s) according to aspects described herein.

FIG. 11 is a flowchart of an example method 1100 for alarming a networked device through an intermediary component relaying alarm signaling from a set of disparate devices provisioned through a set of disparate network platform(s) according to aspects described herein. At act 1110, an indication a device is provisioned through a network platform is received. In an aspect, a network element (e.g., provisioning server 114) can convey the indication the device is provisioned. It should be appreciated that this act is substantially the same as act 910 in example method 900. At act 1120, an indication a device elected to receive alarm signal(s) from a set of devices provisioned through disparate network platforms is received. As an example, the device that elects to receive alarm signaling can be a mobile device provisioned by a wireless network platform. At act 1130, security credentials of the device are received and validated. In an aspect, an intermediary bridge component (e.g., access bridge component 210) effects validation. As described above, in an aspect, credentials can include at least on of passwords, encryption keys, biometric labels, or instruments, such as fingerprint(s) or iris pattern, voice profile, or any combination thereof. Validation of credentials can occur according to various security protocols such as for example Internet Protocol Security (IPsec), Secure Socket Layer (SSL), Transport Layer Security (TLS), Secure Shell (SSH), Secure File Transport Protocol (SFTP), Secure Copy (SCP), biometric locking (e.g., information access through an authorized or registered biometric instrument like), and so forth.

At act 1140, alarm signal(s) associated with the set of devices provisioned through different network platforms is received and retained. In an aspect, the intermediary component can receive and retain the alarm signaling; alarm signaling can be retained in a memory element (see FIG. 6B) of the intermediary component. At act 1150, alarm signal(s) is relayed securely when the device is operationally available. The intermediary component can relay the alarm(s) signaling. It is to be noted that the device may not ne available for various reasons: As an example, radio transceiver in the device (e.g., subscriber station) that elected to receive alarm signal(s) can be turned off (e.g., subscriber station is located in an emergency room, courthouse, airplane . . . ) at the time the alarm signal(s) is to be relayed. As another example, the device may be located in an area with radio link quality that is insufficient for telecommunication. At act 1160, intelligence on received alarm signal(s) is generated and retained. Such intelligence can include reports on alarm signal(s) frequency and source(s); e.g., a specific device, such as an IPTV interface, triggers a parental control alarm on days a specific person, like a nanny or house management staff member, works at the house of the an end-user whose device receives alarm signal(s). As another example, a specific device, e.g., a welding station, in a networked assembly line triggers an alarm when a specific product, e.g., a handset, is being assembled, which can indicate the device is improperly adjusted for such an assembly.

Figure 12:
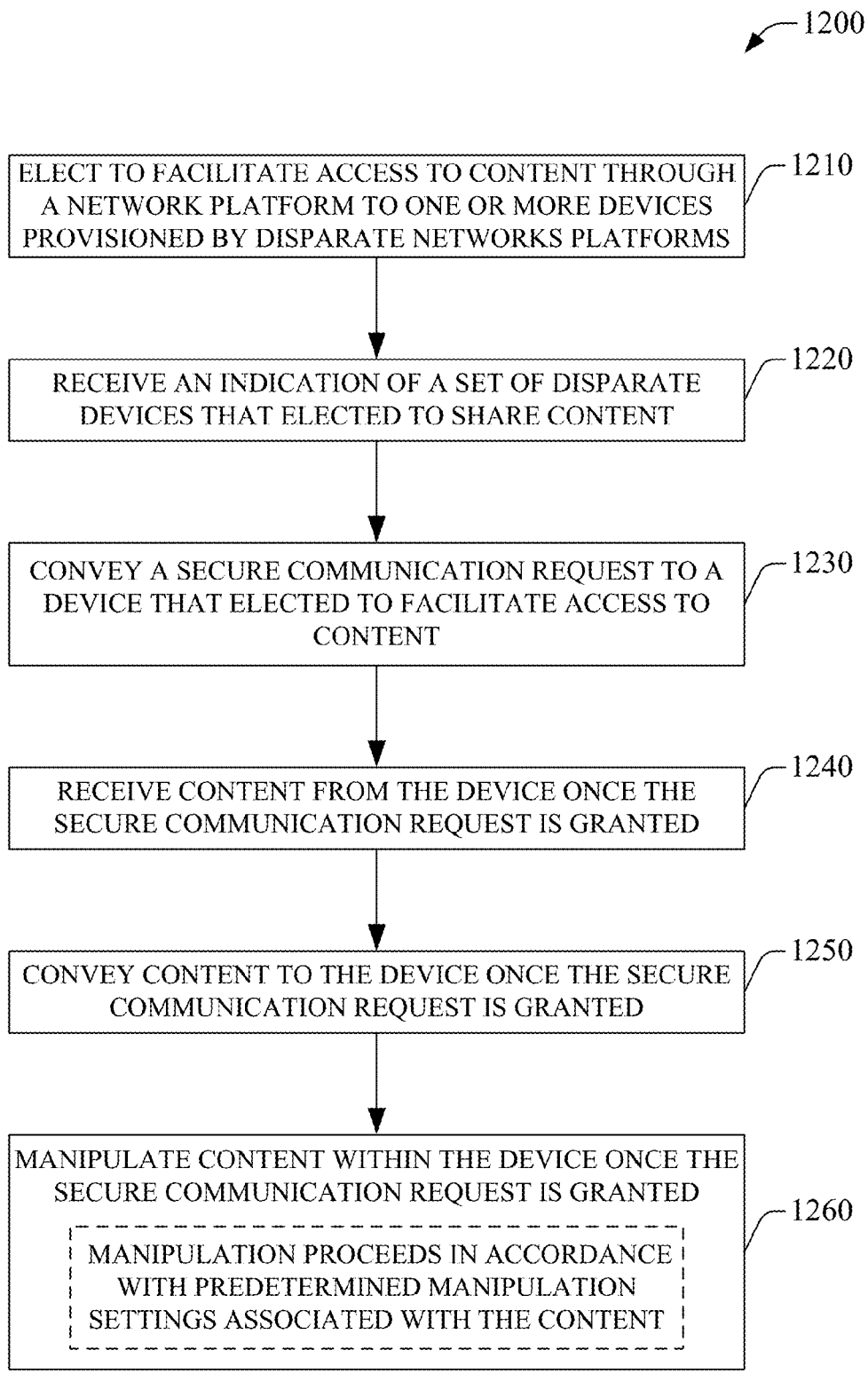
FIG. 12 is a flowchart of an example a method for managing content in networked devices according to aspects described herein.

FIG. 12 is a flowchart of an example a method 1200 for managing content in networked devices according to aspects described herein. In an aspect, this example method if implemented by a provisioned, networked device. At act 1210, it is elected to facilitate access to content through a network platform to one or more devices provisioned by disparate network platforms. A provisioned device typically effects act 1210. In an aspect, content also can be distributed, or "pushed," through one or more of the disparate platforms. At act 1220, an indication of a set of devices that elected to share content is received. The set of devices is provisioned through disparate network platforms. In an aspect, such indication is a broadcast message from a gateway component in a network platform that provisioned a device in the set of devices to a disparate gateway component in disparate network platform(s). In addition, the indication can be conveyed form a network platform to an end user device through various audiovisual messaging mechanisms; e.g., SMS message, MMS message, email communication, IM, ringtone(s), and so forth. It should be appreciated that the indication of the set of devices can be conveyed via substantially any user interface of a device that has elected to share content, such as a gaming console, a DVR, an IPTV display, a PC, a mobile station, etc.

At act 1230, a secure communication request is conveyed to a device that elected to facilitate access to content, the device provisioned by a disparate network platform than the network platform that provisioned a device originating the request. The request can proceed according to various security protocol(s), as described above: Internet Protocol Security (IPsec), Secure Socket Layer (SSL), Transport Layer Security (TLS), Secure Shell (SSH), Secure File Transport Protocol (SFTP), Secure Copy (SCP), biometric locking (e.g., information access through an authorized or registered biometric instrument like), and so forth. Security credentials such as passwords, encryption keys, or digital certificates can be part of the request. At act 1240, content(s) from the device is received once the secure communication request is granted. At act 1250, content is conveyed to the device once the secure communication request is granted. As described above, content associated with acts 1240 and 1250 can include multimedia files or streams, text-based content, etc. At act 1260, content(s) within the device is manipulated once the secure communication request is granted. In an aspect, manipulation is dictated by received directive(s), and proceeds in accordance with predetermined manipulation settings associated with the contents. For example, when the device that grants the secure communication request is a multiuser device that includes content(s) from several end users, organized in several groups, access of disparate content elements, e.g., files, can be determined by an end user or a group to which the end user belongs. It should be appreciated that the manipulation settings can be based at least in part on content's privacy level, content's security level such as confidential or non-confidential, appropriateness of content, and so on.

Figure 13:
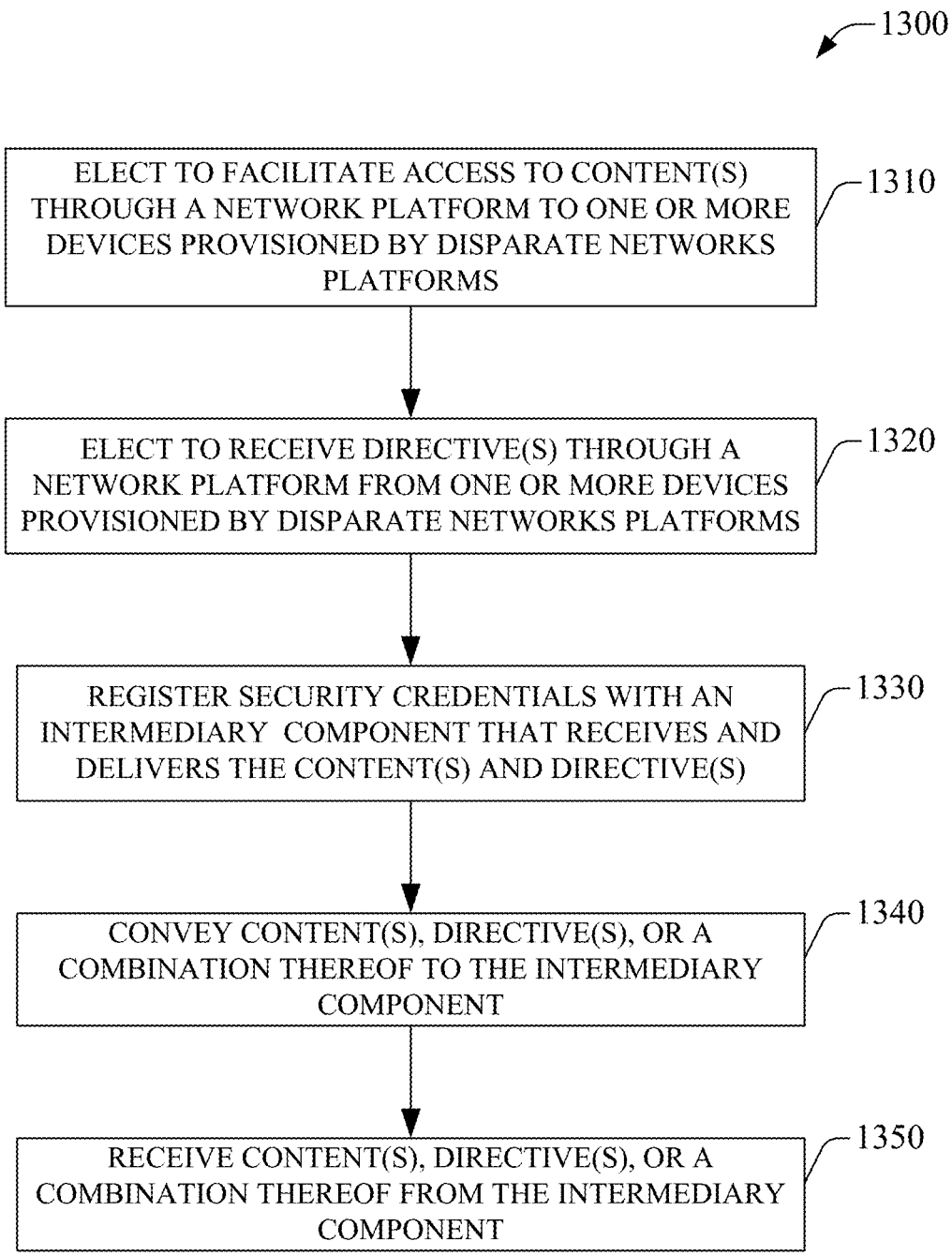
FIG. 13 presents a flowchart of an example method for accessing content in networked devices through an intermediary component. In an aspect, the intermediary component is a network element that serves as pass-through relay for content and directives.

FIG. 13 presents a flowchart of an example method 1300 for accessing content in networked devices through an intermediary component. In an aspect, the intermediary component is a network element that serves as pass-through relay for content and directives. At act 1310, it is elected to facilitate access to content through a network platform to one or more devices provisioned by disparate network platforms. It should be noted that act 1310 is substantially the same as act 1210. A provisioned device typically effects act 1310. At act 1320, it is elected to receive directive(s) through a network platform from one or more devices provisioned by disparate network platforms. It should be appreciated that the electing act in acts 1310 and 1320 can be accomplished by delivering signaling to an intermediary component (e.g., access bridge component 210). At act 1330, a set of security credentials are registered with an intermediary component that receives and delivers the content(s) and directive(s). The intermediary component (e.g., access bridge component 210) can be a centralized component that resides in one of the disparate network platforms that provisions devices. At act 1340, content(s), directive(s), or a combination thereof, are conveyed to the intermediary component. It should be noted that at least one advantage of conveying content(s), directive(s), or a combination of content(s) and directive(s), to the intermediary component is that substantially any provisioned device that has elected to share content can appear as logically active to provisioned devices that intend to submit content(s) or directive(s) to such devices at substantially all times, even though such device can be physically or logically inactive, e.g., device is turned off or unable to communicate due to link failure, or a firewall in device is set to reject substantially all incoming content(s) or directive(s). At act 1350, content(s), directive(s), or a combination thereof, can be received from the intermediary component. In an aspect, content submitted to a device physically inactive, yet logically active through the intermediary component, can be delivered once the device becomes active. While a device is physically inactive, content(s) or directive(s), or a combination thereof, are typically retained in a memory element (e.g., buffered content storage 412).

Figure 14:
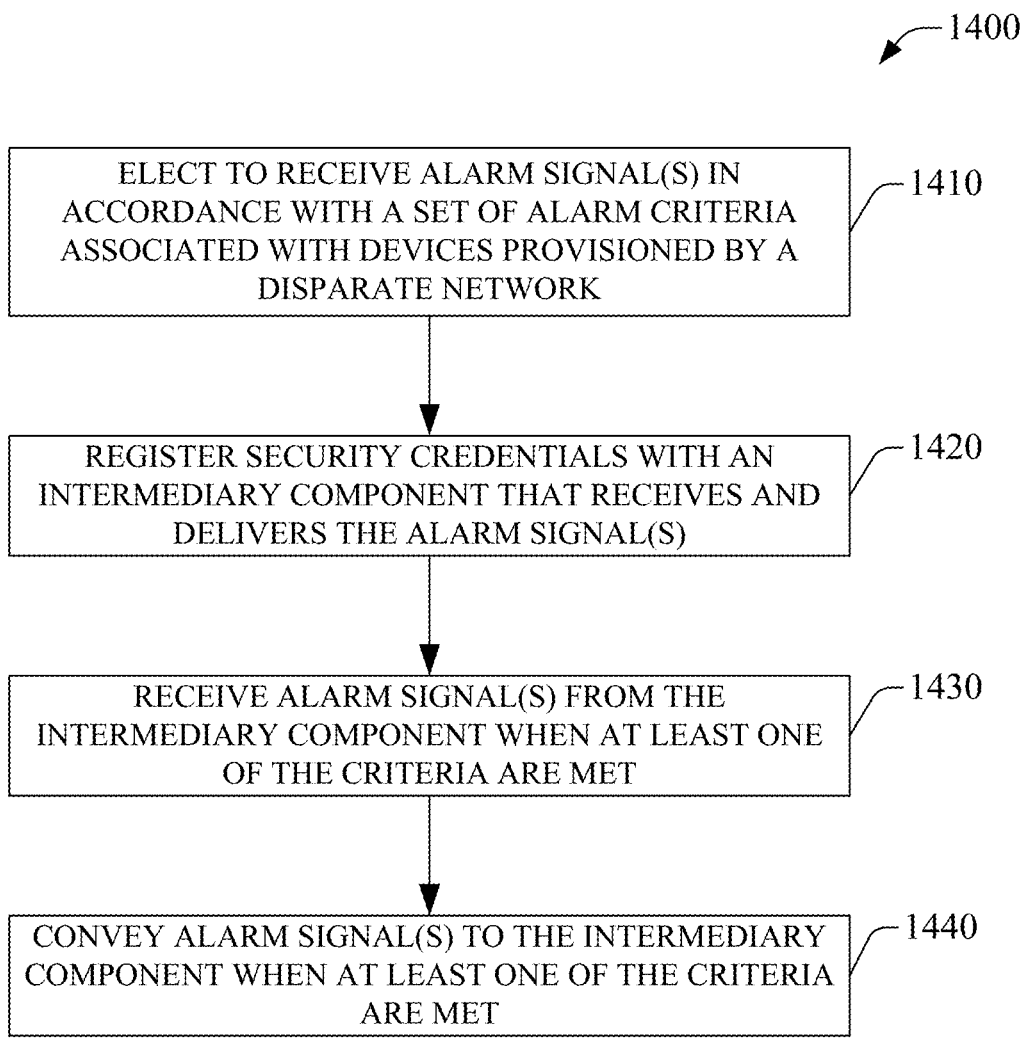
FIG. 14 presents a flowchart of an example method for alarming a networked device through an intermediary component in accordance with aspects described herein. In an aspect, the intermediary component is a network element that serves as pass-through relay for alarm signal(s).

FIG. 14 presents a flowchart of an example method 1400 for alarming a networked device through an intermediary component in accordance with aspects described herein. In an aspect, the intermediary component is a network element that serves as pass-through relay for alarm signal(s). At act 1410, it is elected to receive alarm signal(s) in accordance to a set of alarm criteria associated with devices provisioned by respective network platforms. In aspect, the network platforms are disparate. Alarm criteria can be customized by end user (e.g., a manufacturing plant manager, an owner of a small business) and typically assess operation of a provisioned device according with at least one of predefined, expected, or authorized behavior. Depending on device, illustrative alarm criteria can include the following. (i) For a DVR, unavailable hard drive space for successful recording of a programmed recording schedule; and changes to programmed recording schedule that involves removal of a preferred recording category, e.g., sports, for instance, a football game is removed from the schedule and replaced with a home renovation show. (ii) For a networked PC, access to restricted websites, online gaming outside allowed gaming hours, engaging in unauthorized social networking through web sites, etc. (iii) For VoIP phone, communication(s) that exceed an allotted time (e.g., two hour single call among teenage child and unknown/known party. (iv) For an industrial mixer, unauthorized changes to mix recipe(s), unplanned production of specific mixtures, mixing operation exceeding a predetermined time interval, or mixing temperature, etc.

At act 1420, security credentials are registered with an intermediary component (e.g., access bridge component 210) that receives and delivers the alarm signal(s). As described hereinbefore, security credentials such as passwords, encryption keys, or digital certificates can be part of the request. The security credentials can facilitate secure communication of the alarm(s) signaling. At act 1430, alarm(s) signal(s) are received from the intermediary component when at least one of the alarm(s) criteria are met. The alarm(s) signaling is received when a device that exploits the alarm(s) signal(s) is operationally available. At act 1440, alarm(s) signal(s) are conveyed to the intermediary component when at least one the criteria are met. In an aspect, alarm signaling is conveyed by a provisioned device.

Figure 15:
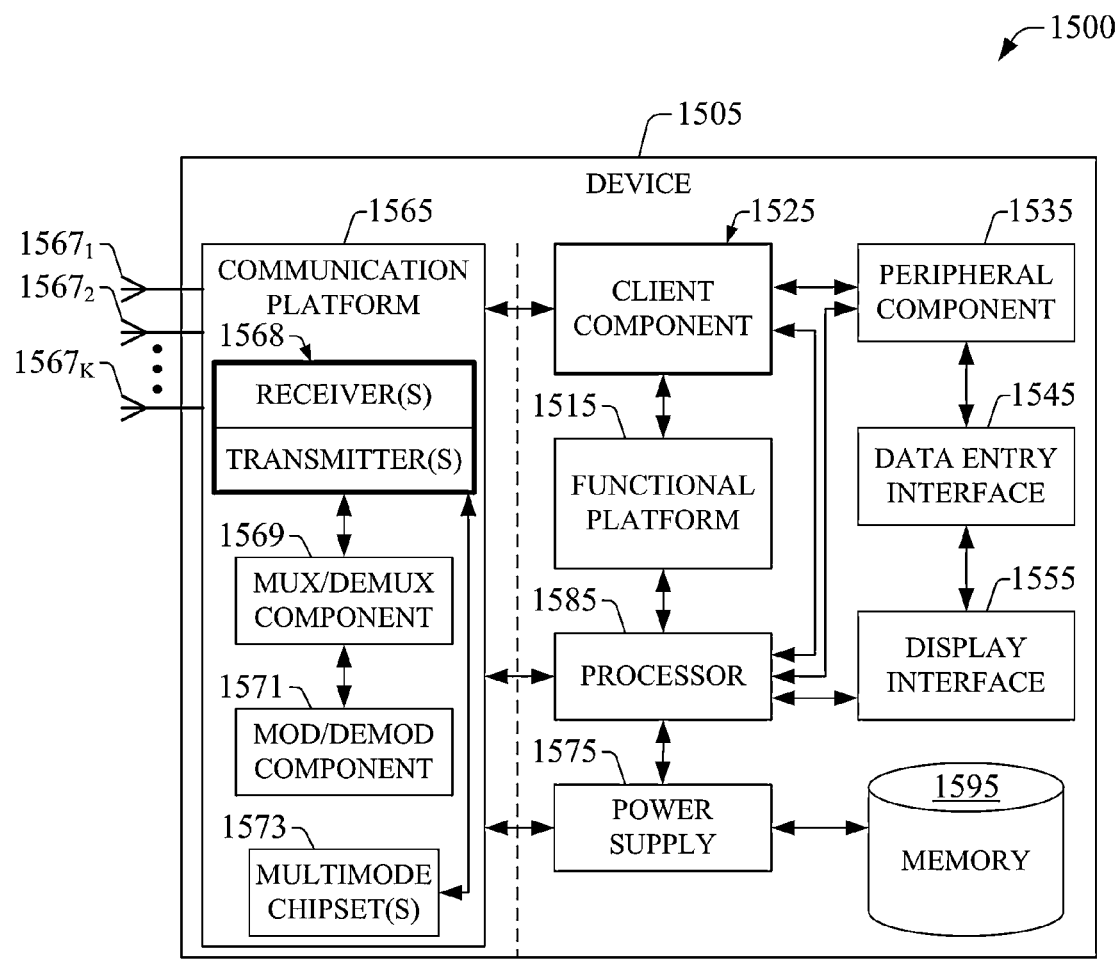
FIG. 15 presents a block diagram of an example embodiment of a device that can exploit various aspects of remote management of content(s) within networked devices provisioned through disparate network platforms as described herein.

To provide further context for various aspects of the subject specification, FIG. 15 presents a block diagram of an example embodiment 1500 of a device that can exploit various aspects of remote management of content(s) within networked devices provisioned through disparate network platforms as described herein. Device 1505 includes a functional platform 1515 that comprises a set of components that provide at least in part specific functionality of the device 1505. Additionally, device 1605 includes a client component 1525 in accordance with aspects described herein. Moreover, in an aspect, device 1505 can include a communication platform 1565 that can provide wireless communication capabilities in addition, or alternatively, to connectivity of device 1505 through wired links (e.g., Ethernet, USB, GPIB, RS-232, FireWire, optical or coaxial cable connection to a network interface such as network interface 120, or router; not shown). With respect to wireless capability, in device 1505, which can be a multimode access terminal, a set of antennas $1567_1$-$1567_K$ (K is a positive integer) can receive and transmit signal(s) from and to wireless devices like access points, access terminals, wireless ports and routers, etc., that operate in a radio access network. Communication platform 1565 can exploit the set of N antennas $1567_1$-$1567_K$, to establish multiple-input multiple output (MIMO) communication. It should be appreciated that antennas $1567_1$-$1567_K$ are a part of communication platform 1525, which comprises electronic components and associated circuitry that provide for processing and manipulation of received signal(s) and signal(s) to be transmitted.

In an aspect, communication platform 1565 includes a receiver(s)/transmitter(s) 1568, associated with antennas $1567_1$-$1567_N$, that can convert signal from analog to digital upon reception, and from digital to analog upon transmission. In addition, receiver/transmitter 1568 can divide a single data stream into multiple, parallel data streams, or perform the reciprocal operation; such operations typically conducted in various multiplexing schemes. Functionally coupled to receiver/transmitter 1568 is a multiplexer/demultiplexer (mux/demux) component 1569 that facilitates manipulation of signal in time and frequency space. Electronic mux/demux component 1569 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1569 can scramble and spread information (e.g., codes) according to substantially any code; e.g., Hadamard-Walsh codes, Baker codes, Kasami codes, polyphase codes, and so on. A modulator/demodulator (mod/demod) component 1571 is also a part of communication platform 1565, and can modulate information according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like. In an aspect of embodiment 1500, mod/demod component 1571 is functionally coupled to mux/demux component 1569.

In communication platform 1565, multimode chipset(s) 1573 allows device 1505, when it embodies a mobile terminal, to operate in multiple communication modes (e.g., EDGE, UMB and Global Positioning System operation) in accordance with disparate technical specifications for wireless technologies. In an aspect, multimode chipset(s) 1573 facilitates operation of communication platform 1565 in accordance with a specific mode of operation (e.g., 3GPP LTE, or EDGE). In another aspect, multimode chipset(s) 1573 can be scheduled to operate concurrently in various modes (e.g., through disjoint utilization of transceivers and receivers when N>1) or within a multi-task paradigm.

Additionally, a peripheral component 1535 can include, or facilitate connection to, additional devices such as printer(s), media player(s), wireless router(s) (e.g., network interface 120), biometrics touch-pad(s), etc. In an aspect, to afford such connectivity, peripheral component 1535 can include jacks for one or more of Ethernet, USB, GPIB, RS-232, FireWire, optical or coaxial cable connectors. Additionally, display interface 1555 can be a part of functional platform (e.g., when device 1505 is a PC, an IPTV interface, a mobile, a back-projector component, a data projector . . . ), and it can also display functions that control functionality of device 1505, or reveal operation conditions thereof (e.g., light-emitting-diode (LED) indicator(s) of networked devices available for content(s) management). For example, display interface 1555 can display at least one of a graphical user interface (e.g., DUI 500, 530, or 560) to navigate and manage content(s) across networked devices provisioned through disparate network platform(s) in accordance with aspects described in the subject specification. In an aspect, display interface 1555 can be a liquid crystal display (LCD), a plasma panel, a monolithic thin-film based electrochromic display, and so on.

It should be appreciated that device 1505 also can include a data entry interface 1545 that can allow an end user to perform at least one of (i) command device 1505 via configuration of functional platform 1515, (ii) interact with a provisioning network platform (e.g., an enterprise network platform) or with an intermediary component for networked content management through device 1505, or (iii) generate content(s) (e.g., images via a built-in camera) or directive(s) for networked content management.

Power supply 1575 can power-up device 1505 and substantially any component included thereon. It should be appreciated that alternative or additional embodiments of device 1505 may not include power supply 1575 and be powered via an attachment to a conventional power grid.

In embodiment 1500, device 1505 includes processor 1585 which can be functionally coupled (e.g., through a memory bus) to memory 1595 in order to store and retrieve information necessary to operate and/or confer functionality, at least in part, to client component 1525, and substantially any component thereon in accordance with aspects described herein; functional platform 1515, communication platform 1565 when device 1505 includes it; and substantially any other component of device 1505. With respect to client component 1525, and component thereon, processor 1585 can be configured to execute security protocols to convey a request for secure content access and manipulation, or to validate a device with an intermediary component for content management. In addition, in connection with communication platform 1565, mobile 1510 also includes a processor 1535 configured to confer functionality, at least in part, to substantially any electronic component within mobile 1510, in accordance with aspects of the subject innovation. As an example, processor 1535 can be configured to execute, at least in part, instructions in multimode operation chipset(s) that afford multimode communication through mobile 1510 like concurrent or multi-task operation of two or more chipset(s). It should be appreciated that processor 1535 can store (e.g., in cache memory) at least temporarily traffic received from communication platform 1525, or both. Moreover, processor 1535 facilitates mobile 1510 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

Memory 1595 can store data structures (e.g., metadata); code structure(s) (e.g., modules, objects, classes, procedures) or instructions, or substantially any type of software or firmware that processor 1585 can execute to provide functionality associated with functional platform 1515; network or device information like policies and specifications; code sequences for scrambling, spreading and pilot (e.g., reference signal(s)) transmission; frequency offsets, and so on. Additionally, memory 1595 also can retain content(s) (e.g., multimedia files) and directive(s), security credentials (e.g., passwords, encryption keys, digital certificates, biometric reference indicators like voice recordings, iris patterns, fingerprints), etc.

Various aspects or features described herein may be implemented as a method, apparatus, or article of manufacture using standard programming and/or engineering techniques. In particular, the aspects or features can be implemented through program modules stored in a memory and executed by a processor, and/or other combination of hardware and software, e.g., firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise provisioning information; security credentials and algorithms; files and applications; policies such as alarm(s) criteria and alarm reports; and so forth. It is to be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of systems and methods that provide advantages of the subject innovation. It is, of course, not possible to describe every conceivable combination of components or methodologies for purposes of describing the subject innovation, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:
1. A method, comprising:
directing, by a system comprising a processor via an access bridge component, a communication request to a device that is associated with content; and
in response to the communication request being determined to be granted,
receiving, by the system, a first portion of the content from the device,
directing, by the system via the access bridge component, a second portion of the content to the device, and
receiving, by the system, an alarm signal based on an alarm criterion that is associated with the content.

2. The method of claim 1, further comprising directing, by the system, a manipulation setting to the device, the manipulation setting being associated with a security level of the first portion of the content.

3. The method of claim 1, further comprising directing, by the system, a manipulation setting to the device, the manipulation setting being associated with a privacy level of the first portion of the content.

4. The method of claim 1, wherein the directing, by the system, the communication request further comprises directing the communication request to the device based on a security protocol.

5. The method of claim 1, further comprising receiving, by the system from a gateway device of a network platform, a message indicating the device elected to share the content.

6. The method of claim 1, further comprising:
registering, by the system, security credentials with an intermediary device;
receiving, by the system, the first portion of the content from the intermediary device; and
directing, by the system, the second portion of the content to the intermediary device.

7. The method of claim 6, wherein the receiving the alarm signal further comprises receiving the alarm signal via the intermediary device.

8. The method of claim 7, wherein the receiving the alarm signal via the intermediary device further comprises receiving the alarm signal from the intermediary device in response to the alarm criterion being determined to be satisfied.

9. The method of claim 1, further comprising:
electing, by the system, to facilitate access to the content via respective devices provisioned through disparate network platforms.

10. A computer-readable storage device comprising code instructions that, in response to execution, cause a system comprising a processor to perform operations, comprising:
directing a communication request to a device electing to share content;
receiving, based on the communication request, a first portion of the content from the device;
directing, based on the communication request, a second portion of the content to the device; and
receiving an alarm signal based on an alarm criterion that is associated with the content.

11. The computer-readable storage device of claim 10, the operations further comprising:
directing a manipulation setting to the device, the manipulation setting being associated with a security level of the first portion of the content.

12. The computer-readable storage device of claim 10, the operations further comprising:
directing a manipulation setting to the device, the manipulation setting being associated with a privacy level of the first portion of the content.

13. The computer-readable storage device of claim 10, wherein the directing the communication request further comprises directing the communication request to the device based on a security protocol.

14. The computer-readable storage device of claim 10, the operations further comprising:
receiving, from a gateway device of a network platform, a message indicating the device elected to share the content.

15. The computer-readable storage device of claim 10, the operations further comprising:
registering security credentials with an intermediary device;
receiving the first portion of the content from the intermediary device; and
directing the second portion of the content to the intermediary device.

16. The computer-readable storage device of claim 15, wherein the receiving the alarm signal further comprises receiving the alarm signal via the intermediary device.

17. The computer-readable storage device of claim 16, wherein the receiving the alarm signal via the intermediary device further comprises receiving the alarm signal from the intermediary device in response to the alarm criterion being determined to be satisfied.

18. A system, comprising:
a memory to store instructions; and
a processor, coupled to the memory, that facilitates execution of the instructions to perform operations, comprising:
receiving a first portion of content from a device;
directing a second portion of the content to the device in response to a communication request being determined to have been granted; and
relaying an alarm signal in response to a criterion being determined to have been satisfied based on the content.

19. The system of claim 18, wherein the operations further comprise receiving the first portion of the content from the device based on a security protocol.

20. The system of claim 19, wherein the security protocol comprises a biometric locking protocol.

* * * * *